(12) United States Patent
Lan

(10) Patent No.: US 10,814,478 B2
(45) Date of Patent: Oct. 27, 2020

(54) JOINT MODULE AND MULTI-JOINT MODULAR ROBOT ARM

(71) Applicant: NATIONAL CHENG KUNG UNIVERSITY, Tainan (TW)

(72) Inventor: Chao-Chieh Lan, Tainan (TW)

(73) Assignee: National Cheng Kung University, Tainan (TW)

( * ) Notice: Subject to any disclaimer, the term of this patent is extended or adjusted under 35 U.S.C. 154(b) by 273 days.

(21) Appl. No.: 15/843,191

(22) Filed: Dec. 15, 2017

(65) Prior Publication Data

US 2019/0184549 A1 Jun. 20, 2019

(51) Int. Cl.
| | |
|---|---|
| *B25J 9/04* | (2006.01) |
| *B25J 9/06* | (2006.01) |
| *B25J 17/00* | (2006.01) |
| *B25J 15/00* | (2006.01) |
| *B25J 18/00* | (2006.01) |
| *B25J 17/02* | (2006.01) |

(52) U.S. Cl.
CPC ............. *B25J 9/043* (2013.01); *B25J 9/06* (2013.01); *B25J 15/0028* (2013.01); *B25J 17/00* (2013.01); *B25J 17/0266* (2013.01); *B25J 18/00* (2013.01); *Y10S 901/15* (2013.01); *Y10S 901/24* (2013.01); *Y10S 901/25* (2013.01); *Y10S 901/28* (2013.01); *Y10S 901/31* (2013.01)

(58) Field of Classification Search
CPC . B25J 9/043; B25J 9/06; B25J 15/0028; B25J 17/00; B25J 17/0266; B25J 18/00; Y10S 901/15; Y10S 901/24; Y10S 901/25; Y10S 901/28; Y10S 901/31; F16H 25/20; F16H 25/24

USPC ....................................................... 74/490.01
See application file for complete search history.

(56) References Cited

U.S. PATENT DOCUMENTS

| | | | |
|---|---|---|---|
| 4,821,594 A | * | 4/1989 | Rosheim .................. B25J 9/104 |
| | | | 294/106 |
| 6,860,169 B2 | | 3/2005 | Shinozaki |
| 9,764,464 B2 | | 9/2017 | Sarh et al. |

(Continued)

FOREIGN PATENT DOCUMENTS

DE 102008016708 A1 * 10/2009 ............ B25J 9/0072

OTHER PUBLICATIONS

International Search Report Issued by a Foreign Patent Office.

*Primary Examiner* — Jake Cook
*Assistant Examiner* — T. Scott Fix
(74) *Attorney, Agent, or Firm* — Rosenberg, Klein & Lee

(57) ABSTRACT

A joint module has a base, a motion mechanism, a linear driving mechanism, a driving motor assembly, and a transmission. The motion mechanism, the linear driving mechanism, and the driving motor assembly are disposed on the base. The transmission is disposed between the linear driving mechanism and the driving motor assembly. A first transmitting assembly and a second transmitting assembly of the motion mechanism are disposed on the base in parallel. A first linear driving assembly and a second linear driving assembly of the linear driving mechanism are non-coaxial and are disposed on the base in parallel. A first wheel transmitting assembly of the transmission is connected to the driving motor assembly and the first linear driving assembly. A second wheel transmitting assembly of the transmission is connected to the driving motor assembly and the second linear driving assembly.

14 Claims, 17 Drawing Sheets

(56) References Cited

U.S. PATENT DOCUMENTS

| | | | |
|---|---|---|---|
| 2003/0101838 A1* | 6/2003 | Shinozaki | A61F 2/585 74/490.05 |
| 2004/0024385 A1* | 2/2004 | Stuart | B25J 9/1065 606/1 |
| 2004/0126198 A1* | 7/2004 | Chen | B23Q 1/5462 409/201 |
| 2005/0159075 A1* | 7/2005 | Isobe | B25J 17/0266 446/104 |
| 2006/0213308 A1* | 9/2006 | Rosheim | B25J 17/0266 74/490.01 |
| 2007/0295139 A1* | 12/2007 | Ota | B23Q 1/5462 74/490.07 |
| 2008/0202274 A1* | 8/2008 | Stuart | B25J 9/106 74/490.02 |
| 2008/0267756 A1* | 10/2008 | Echelmeyer | B25J 17/0266 414/749.1 |
| 2012/0286629 A1 | 11/2012 | Johnson et al. | |
| 2016/0114479 A1* | 4/2016 | Rosheim | A61B 34/37 74/490.03 |
| 2019/0168400 A1* | 6/2019 | Kamon | B25J 17/00 |

\* cited by examiner

JOINT MODULE AND MULTI-JOINT MODULAR ROBOT ARM

BACKGROUND OF THE INVENTION

1. Field of the Invention

The present invention relates to a joint module and a multi joint modular robot arm, and more particularly to a joint module and a multi joint modular robot arm that may improve the flexibility of the multi joint modular robot arm.

2. Description of Related Art

Conventional multi joint modular robot arms are applied to the automation industry and are controlled by programs to do tasks such as pick-and-place of objects, carriage, welding, polishing, and painting automatically. The conventional multi joint modular robot arm may be a six-axis robot arm having six rotating drivers connected vertically, or having a selective compliance articulated robot arm (SCARA), or having a robot arm combining two rotating drivers connected in parallel and a linear driver, or having a robot arm combining three rotating drivers connected in parallel. The six-axis robot arm having six rotating drivers connected vertically has more freedom and is widely used.

The six-axis robot arm is composed by the six rotating drivers connected vertically. Each rotating driver is a joint module. Each rotating driver may be composed of a motor and a harmonic gear, or a worm wheel and a worm assembly. Each rotating driver is only capable of a single axis rotation. A manufacturing cost of each rotating driver is high by using the specific harmonic gear. In operation of the six-axis robot arm, the end movement path of the six-axis robot arm is not flexible enough.

For overcoming the problems that each rotating driver is only capable of the single axis rotation and the end movement path of the six-axis robot arm is not flexible enough, a prior joint module has been invented by the inventor of the invention. With reference to FIGS. 15 to 18, the prior joint module has a base 70, two screw linear driving assemblies 71, 72, and two motors 73, 74. The two screw linear driving assemblies 71, 72 and two motors 73, 74 are disposed on the base 70. The two screw linear driving assemblies 71, 72 are arranged up and down in parallel. The two motors 73, 74 are respectively connected to the two screw linear driving assemblies 71, 72. Two linear motion elements of the two screw linear driving assemblies 71, 72 are connected to a motion element 77 by two connecting rod assemblies 75, 76 respectively. The two connecting rod assemblies 75, 76 are connected to the motion element 77 in parallel. The two motors 73, 74 respectively drive the two connecting rod assemblies 75, 76 by the two screw linear driving assemblies 71, 72. The motion element 77 driven by the two connecting rod assemblies 75, 76 could rotate top to bottom and left to right for biaxial spherical rotating movement.

The problems of each rotating driver only capable of the single axis rotation and the end movement path of the six-axis robot arm being not flexible enough can be overcome by the prior joint module. The problem of the single axis joint module using the harmonic gear is solved by the prior joint module. The problem of the single axis joint module using the worm assembly and the worm wheel is solved by the prior joint module, too. In the prior joint module capable of biaxial spherical rotating movement, the two motors 73, 74 are directly connected to the two screw linear driving assemblies 71, 72 and the two connecting rod assemblies 75, 76 for connecting the motion element 77. In a limited space and to meet different requirements, a reduction ratio and a torque speed of the prior joint module are hard to change. The reduction ratio and the torque speed of the prior joint module are not easy to customize.

To overcome the shortcomings, the present invention provides a joint module and a multi joint modular robot arm to mitigate or obviate the aforementioned problems.

SUMMARY OF THE INVENTION

The objective of the invention is to provide a joint module and a multi-joint modular robot arm that may solve the problems that each rotating driver is only capable of the single axis rotation and the end movement path of the six-axis robot arm is not flexible enough, and improves the practicality of the prior joint module that is capable of biaxial spherical rotating movement.

The joint module has a base, a motion mechanism, a linear driving mechanism, a driving motor assembly, and a transmission.

The base has a central axis. The central axis is defined on the base.

The motion mechanism is disposed on the base and has a motion element, a first transmitting assembly, and a second transmitting assembly. The first transmitting assembly and the second transmitting assembly are disposed on the base in parallel and are connected to the motion element. The motion element is driven for having a spherical movement centered on the central axis of the base.

The linear driving mechanism is disposed on the base and has a first linear driving assembly and a second linear driving assembly. The first linear driving assembly and the second linear driving assembly are non-coaxial and are disposed on the base in parallel. The first linear driving assembly has a first linear moving member and a first screw assembly. The first linear moving member is connected to the first transmitting assembly. The first screw assembly is connected to the first linear moving member. The first linear moving member is driven by the first screw assembly to reciprocate along the central axis. The second linear driving assembly has a second linear moving member and a second screw assembly. The second linear moving member is connected to the second transmitting assembly. The second screw assembly is connected to the second linear moving member. The second linear moving member is driven by the second screw assembly to reciprocate along the central axis.

The driving motor assembly is disposed on the base. The driving motor assembly has a first motor having a first output rod and a second motor having a second output rod.

The transmission is disposed between the linear driving mechanism and the driving motor assembly and has a first wheel transmitting assembly and a second wheel transmitting assembly. The first wheel transmitting assembly is connected to the first output rod of the driving motor assembly and the first linear driving assembly. The second wheel transmitting assembly is connected to the second output rod of the driving motor assembly and the second linear driving assembly.

The joint module has the following advantages:

1. Biaxial spherical rotating movement: in the invention, the first transmitting assembly and the second transmitting assembly are disposed on the base in parallel to connect to the motion element. The first transmitting assembly is connected to the first motor by the first linear driving assembly and the first wheel transmitting assembly. The second transmitting assembly is connected to the second motor by the second linear driving assembly and the second wheel transmitting assembly. The first transmitting assembly is driven by the first motor independently. The second transmitting assembly is driven by the second motor independently. Thus, the motion element can be driven to accomplish the biaxial spherical rotating movement.

2. High rigidity: the first transmitting assembly and the second transmitting assembly are disposed on the base in parallel to connect to the motion element. The first transmitting assembly is connected to the first motor by the first linear driving assembly and the first wheel transmitting assembly. The second transmitting assembly is connected to the second motor by the second linear driving assembly and the second wheel transmitting assembly. The first transmitting assembly is driven by the first motor alone. The second transmitting assembly is driven by the second motor alone. By the transmitting structures in the joint module, the motion element has high rigidity in the biaxial spherical rotating movement.

3. Changeable reduction ratio: the reduction ratio of the driving motor assembly and the transmission is adjustable. The reduction ratio is variable when the size and the structure of the joint module are not changed. The joint module can be reused and is easy to customize. The joint module can provide the excellent torque speed by the combination of the driving motor assembly and the transmission. The efficiency of the joint module is increased.

Furthermore, the base has a first end and a second end defined along the central axis of the base. The motion element is disposed at the first end of the base. The first output rod of the driving motor assembly, the second output rod of the driving motor assembly, the first linear moving member, and the second linear moving member are juxtaposed in parallel on the base. The first wheel transmitting assembly and the second wheel transmitting assembly are disposed at the second end of the base. Thus, the first wheel transmitting assembly and the second wheel transmitting assembly are easy to assemble and replace. The spatial configuration of the joint module is good.

Furthermore, the first motor and the second motor are stepper motors. The first wheel transmitting assembly and the second wheel transmitting assembly are pulley assemblies, sprocket assemblies, or gear assemblies for connecting the first screw assembly and the second screw assembly of the linear driving mechanism. The technology of the stepper motors, the pulley assemblies, the sprocket assemblies, or the gear assemblies is maturely developed and well known in the art. Components of the joint module are not specific. The manufacturing cost can be controlled effectively.

In addition, the joint module uses a reducer with the stepper motors and the wheel transmitting assemblies for having a high reduction ratio in a limited space without a harmonic gear reducer. The stepper motors are capable of the forward driving and the backward driving and are used in the joint module. The joint module has a high torque density ratio, a low price, and a high reliability to enhance the market competitiveness.

Furthermore, the joint module has a shell, a chamber, an opening, and an outer plate. The shell is disposed on the base. The chamber is formed between the shell and the base. The opening is formed on the shell adjacent to the first end of the base and communicates with the chamber. The outer plate is formed on the shell adjacent to the second end of the base. The motion mechanism, the linear driving mechanism, the driving motor assembly, and the transmission are disposed in the chamber of the joint module. The motion mechanism, the linear driving mechanism, the driving motor assembly, and the transmission are protected by the shell and the base. The outer plate can be connected to a motion mechanism of another joint module.

Furthermore, the joint module has two strain gauges. The two strain gauges are respectively disposed on the first transmitting assembly and the second transmitting assembly for measuring deformations of the first transmitting assembly and the second transmitting assembly. The joint module may be combined with a force controlled system for doing a biaxial compliance movement.

The multi joint modular robot arm has multiple joint modules as described. The joint modules are connected in series. Each two joint modules are connected in series. The base of one of said two joint modules is connected to the motion element of another one of said two joint modules.

The multi joint modular robot arm has the joint modules connected in series. Each joint module has the function of biaxial rotating movement. The combination of the joint modules in the multi joint modular robot arm is variable. The reduction ratio of each joint module may be changed by the transmission. The driving energy provided by the driving motor assembly can be applied efficiently. Each joint module has the function of biaxial spherical rotating movement. Thus, the flexibility of the multi joint modular robot arm is good.

Furthermore, the reduction ratio of the driving motor assembly and the transmission is adjustable and variable when the size and the structure of the joint module are not changed. The multi joint modular robot arm can be reused and is easy to customize. The practicality of the multi joint modular robot arm is good.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
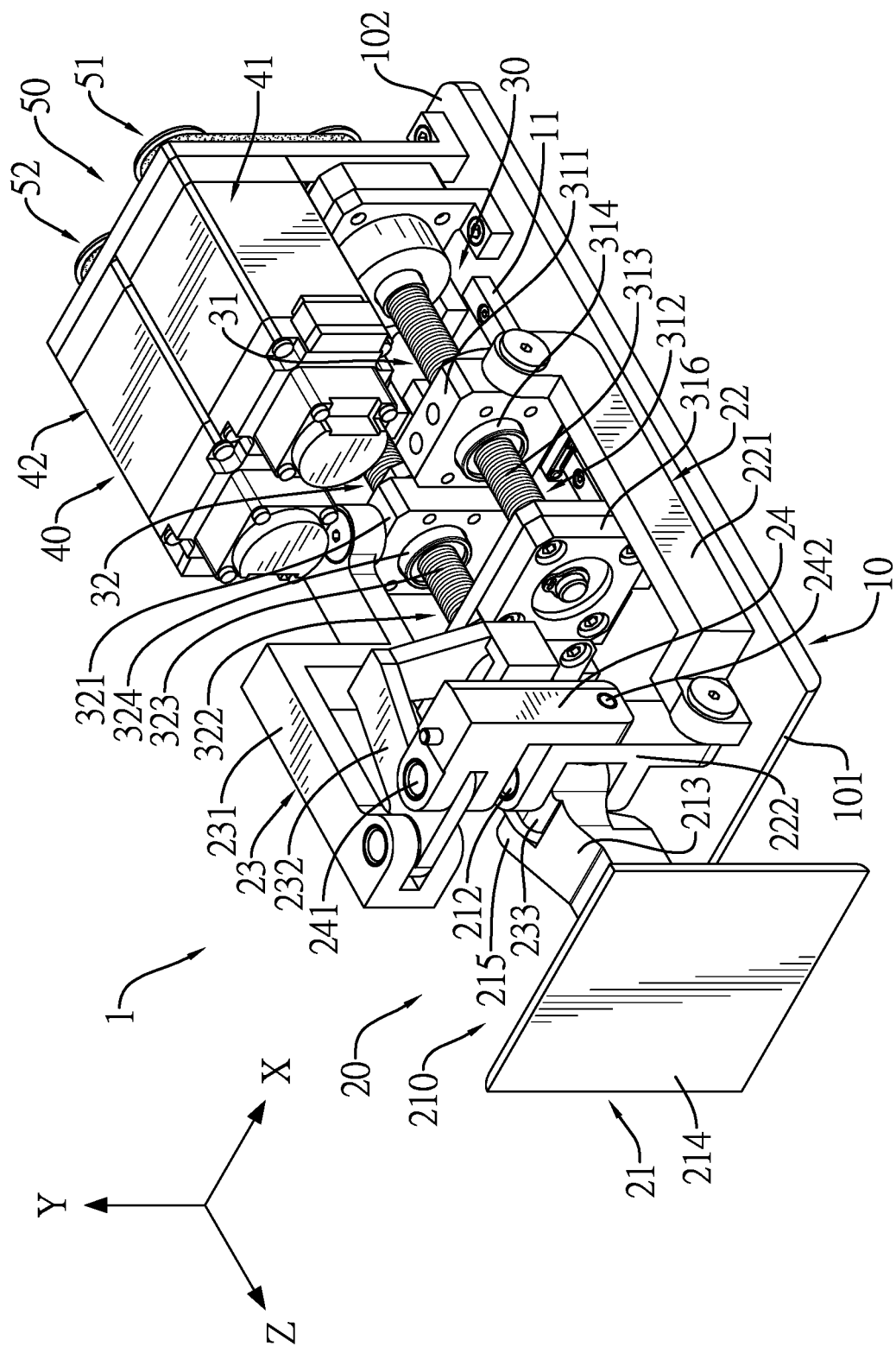
FIG. 1 is a perspective view of a joint module in accordance with the present invention.
Figure 2:
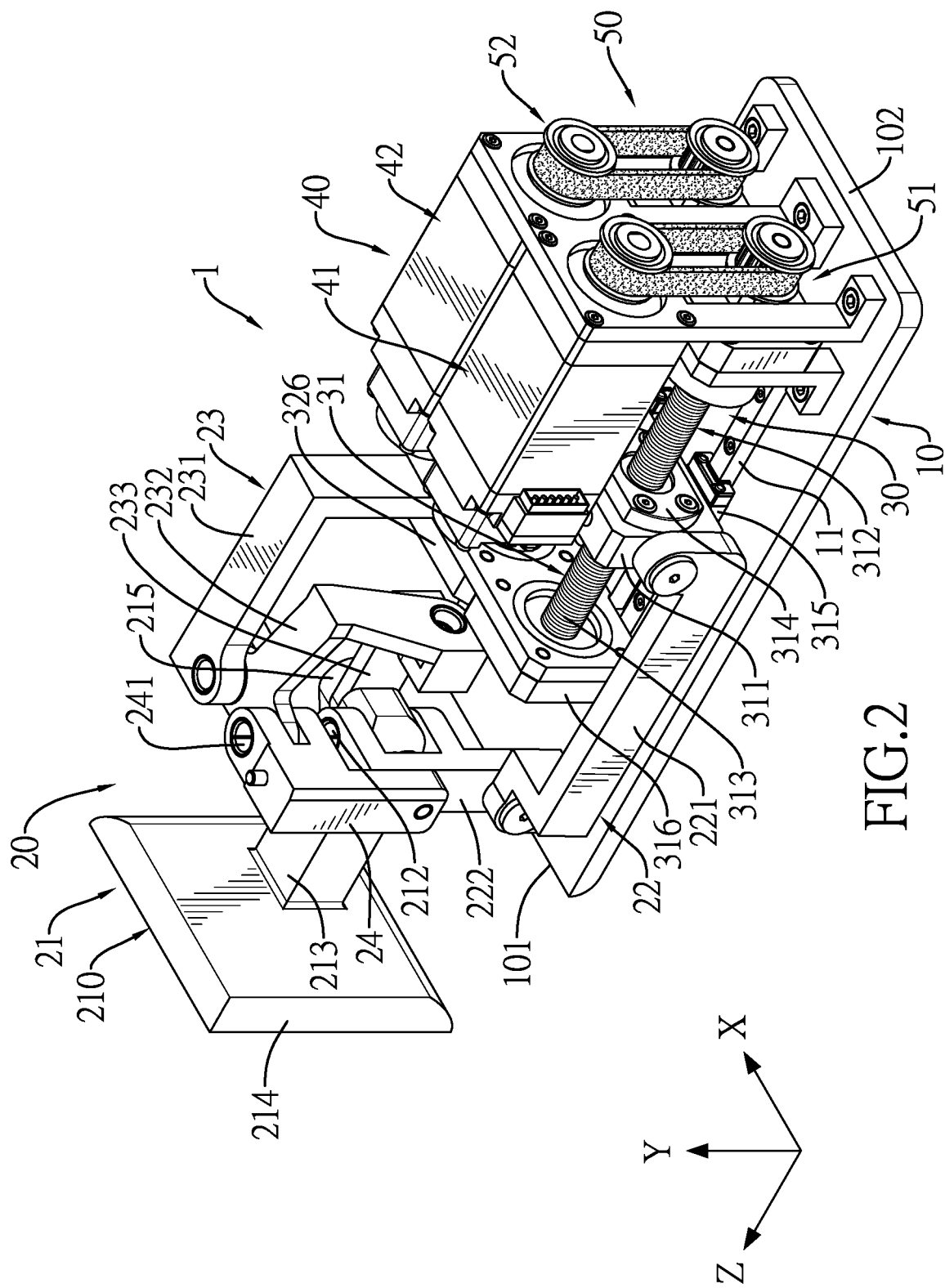
FIG. 2 is another perspective view of the joint module in FIG. 1.
Figure 3:
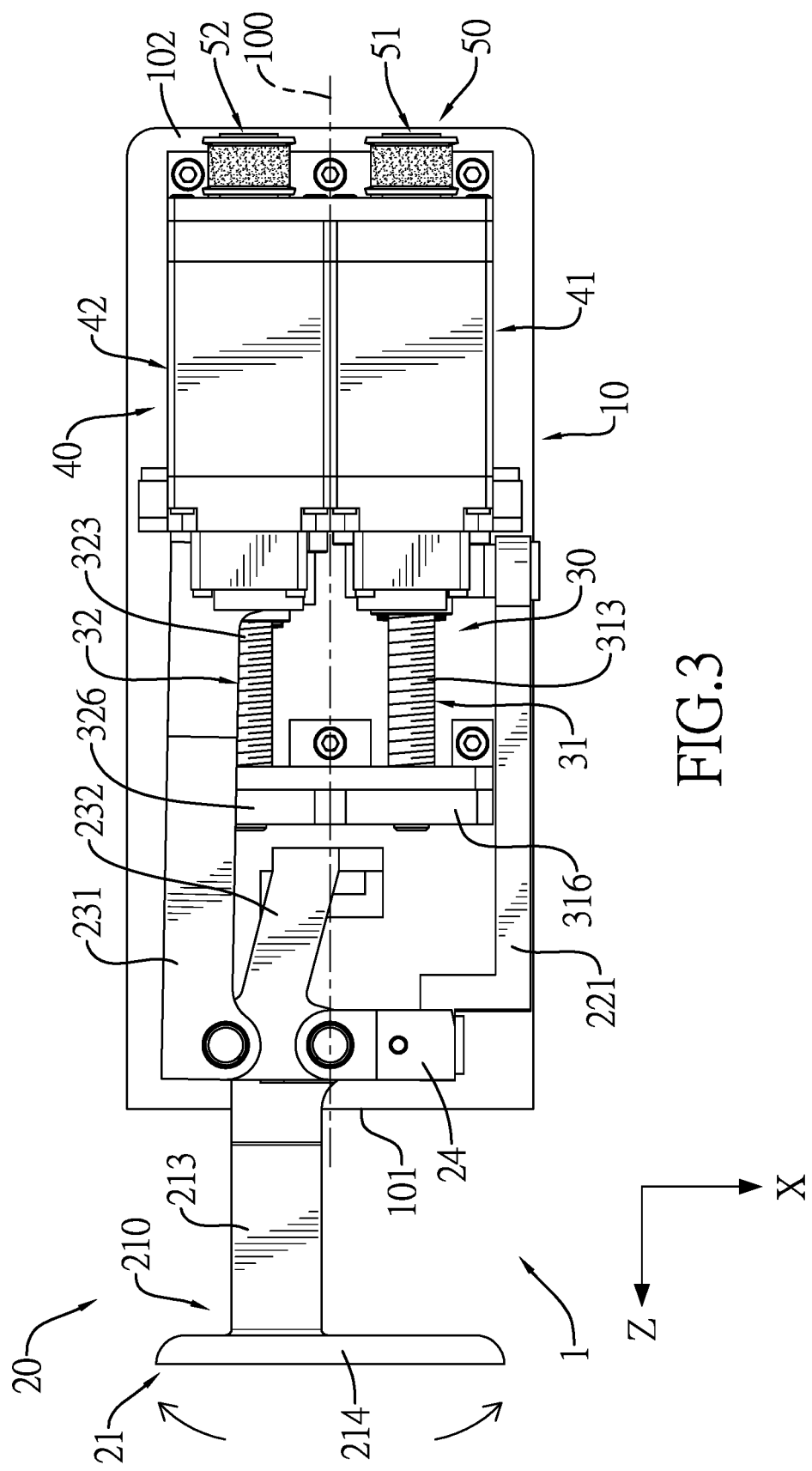
FIG. 3 is a top view of the joint module in FIG. 1.
Figure 4:
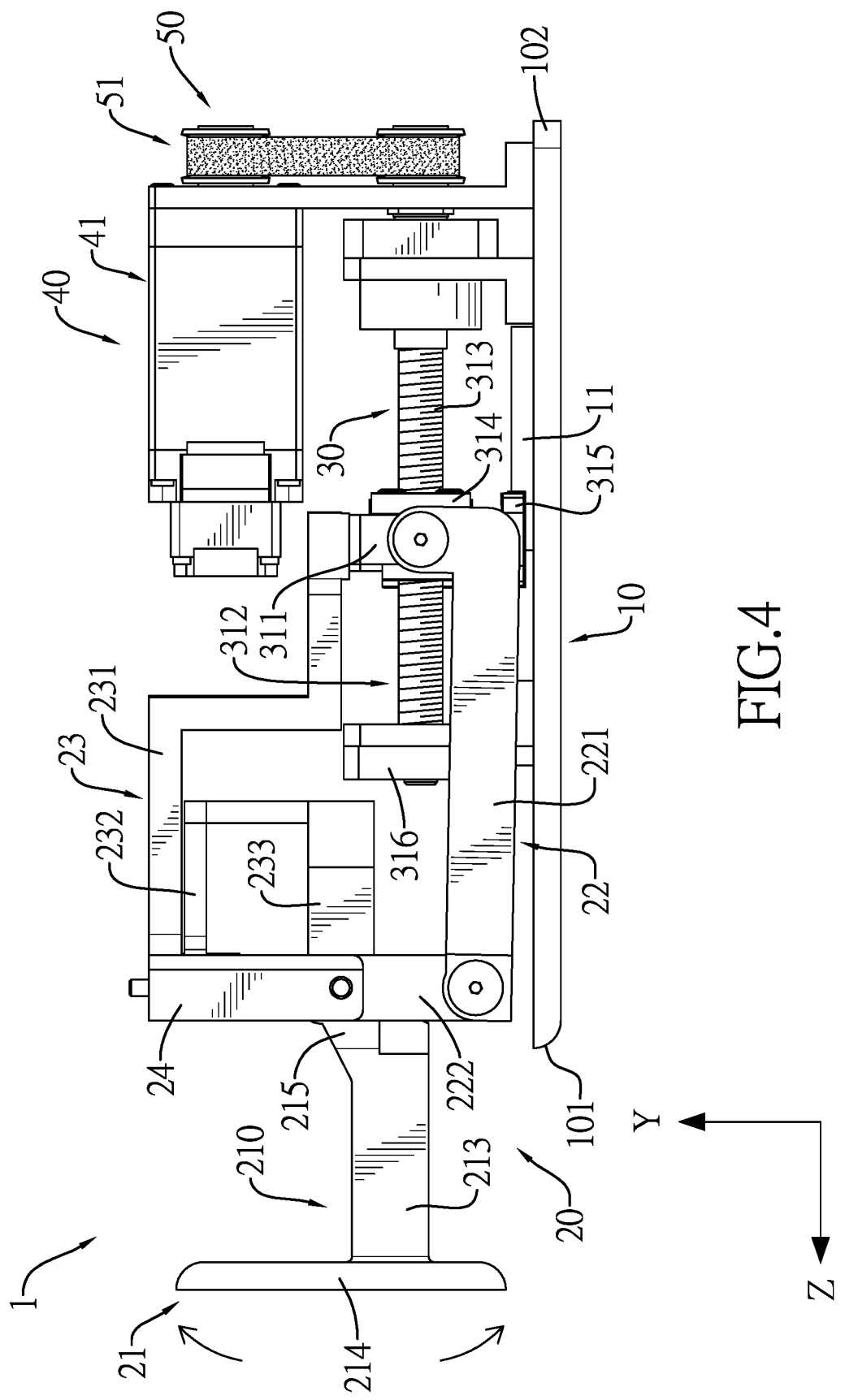
FIG. 4 is a side view of the joint module in FIG. 1.

With reference to FIGS. 1 and 2, a joint module 1 in accordance with the present invention comprises a base 10, a motion mechanism 20, a linear driving mechanism 30, a driving motor assembly 40, and a transmission 50.

Figure 5:
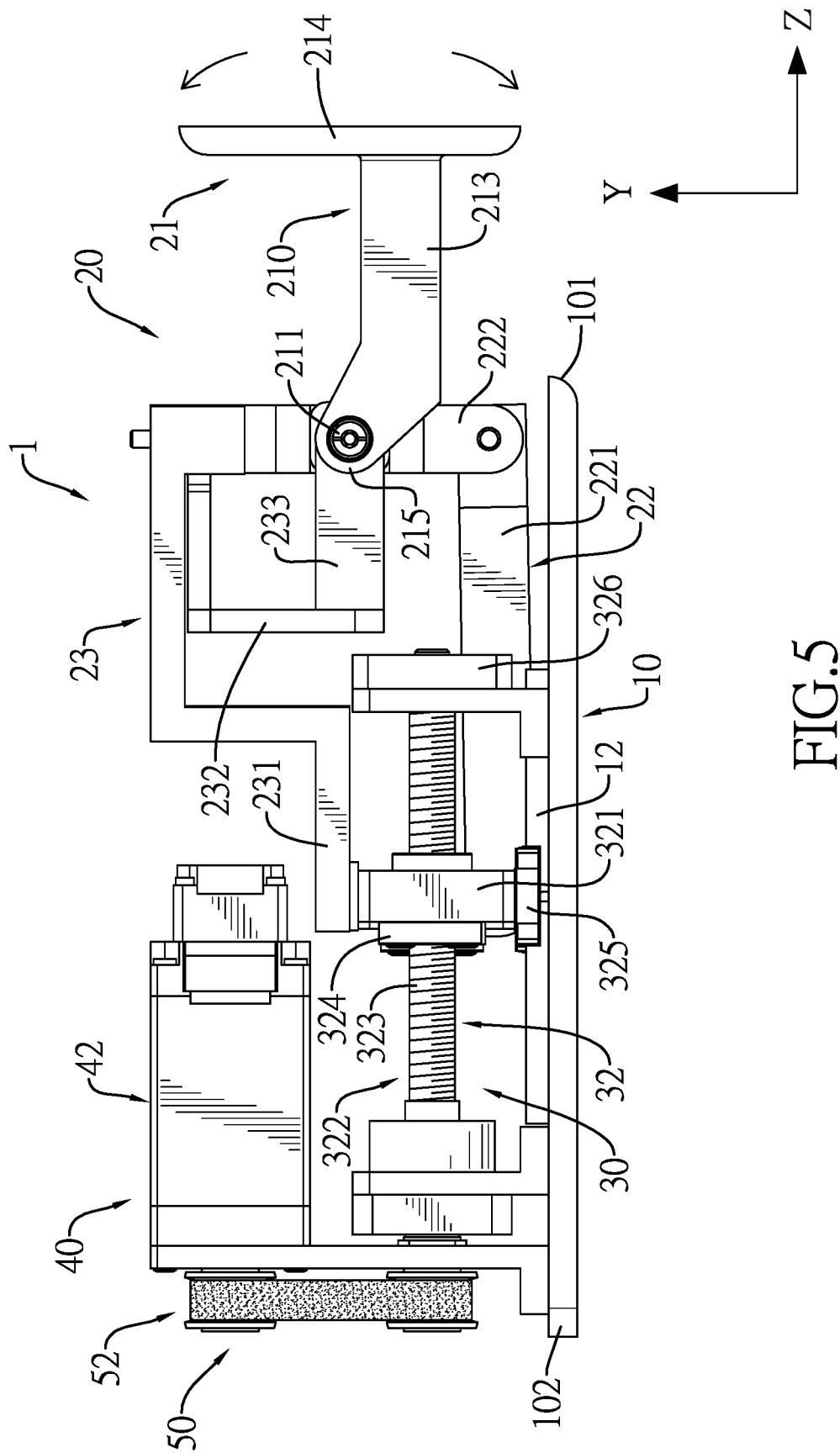
FIG. 5 is another side view of the joint module in FIG. 1.

With reference to FIGS. 1 and 5, the base 10 has a central axis 100. The central axis 100 is defined on the base 10. The base 10 has a first end 101 and a second end 102. The first end 101 and the second end 102 are defined along the central axis 100 of the base 10. The base 10 has an X axial direction, a Y axial direction, and a Z axial direction. The Y axial direction is perpendicular to the X axial direction. The Z axial direction is perpendicular to the X axial direction and the Y axial direction. A direction of the central axis 100 is the Z axial direction.

With reference to FIGS. 1 to 5, the joint module has a first slide rail 11 and a second slide rail 12. The first slide rail 11 and the second slide rail 12 are disposed on the base 10 at a spaced interval and are parallel with the central axis 100 of the base 10.

With reference to FIGS. 1 to 5, the motion mechanism 20 is disposed on the base 10 and has a motion element 21, a first transmitting assembly 22, and a second transmitting assembly 23. The first transmitting assembly 22 and the second transmitting assembly 23 are disposed on the base 10 in parallel and are connected to the motion element 21. The motion element 21 can be driven to have a spherical movement centered on the central axis 100 of the base 10.

With reference to FIGS. 1 to 5, the motion element 21 is movably disposed on the first end 101 of the base 10. The motion element 21 has a motion part 210, an X axial rod 211, and a Y axial rod 212. The motion part 210 has a connecting rod portion 213, a connecting end 215, and an end plate 214. The connecting rod portion 213 has two ends. The connecting end 215 is formed on one of the two ends of the connecting rod portion 213. The end plate 214 is disposed on the other one of the two ends of the connecting rod portion 213. The end portion 214 is used as an outer connecting component. The X axial rod 211 and the Y axial rod 212 are independently disposed through the connecting end 215 of the connecting rod portion 210.

With reference to FIGS. 1 to 5, the first transmitting assembly 22 has a first transmitting member 221 and a second transmitting member 222. The first transmitting member 221 has two ends, and one of the two ends is pivotally connected to the linear driving mechanism 30. Two ends of the second transmitting member 222 are pivotally connected to the other end of the first transmitting member 221 and the X axial rod 211, respectively. Thus, the X axial rod 211 is a fulcrum, and the motion part 210 is rotated along the Y axial direction by the linear driving mechanism 30.

With reference to FIGS. 1 to 5, the second transmitting assembly 23 has a first rod 231, a second rod 232, and a third rod 233. An end of the first rod 231 is pivotally connected to the linear driving mechanism 30. Two ends of the second rod 232 are pivotally connected to another end of the first rod 231 and an end of the third rod 233 respectively. Another end of the third rod 233 is pivotally connected to the Y axial rod 212. Thus, the Y axial rod 212 is a fulcrum, and the motion part 210 is rotated along the X axial direction by the linear driving mechanism 30.

With reference to FIGS. 1 to 5, for improving the flexibility of the motion mechanism 20, the motion mechanism 20 further has a motion seat 24. The motion seat 24 is disposed on the base 10 and is rotated along the X axial direction when the Y axial direction is a fulcrum. An end of the motion seat 24 at the Y axial direction is connected to an X axial pivoting component 241 for pivotally connecting the second transmitting member 222. Another end of the motion seat 24 at the Y axial direction is connected to a Y axial pivoting component 242 for pivotally connecting the second rod 232. A pivoted portion between the motion seat 24 and the second rod 232 is located beside a pivoted portion between the first rod 231 and the second rod 232.

With reference to FIGS. 1 to 5, the linear driving mechanism 30 is disposed on the base 10 and has a first linear driving assembly 31 and a second linear driving assembly 32. The first linear driving assembly 31 and the second linear driving assembly 32 are non-coaxial and are disposed on the base 10 in parallel. The first linear driving assembly 31 has a first linear moving member 311 and a first screw assembly 312. The first linear moving member 311 is connected to the first transmitting assembly 22. The first screw assembly 312 is connected to the first linear moving member 311. The first linear moving member 311 is driven by the first screw assembly 312 to move reciprocally along the central axis 100. The second linear driving assembly 32 has a second linear moving member 321 and a second screw assembly 322. The second linear moving member 322 is connected to the second transmitting assembly 23. The second screw assembly 322 is connected to the second linear moving member 321. The second linear moving member 321 is driven by the second screw assembly 322 to move reciprocally along the central axis 100. Furthermore, the first linear moving member 311 is pivoted to the first transmitting member 221 of the first transmitting assembly 22. The second linear moving member 321 is pivotally connected to the first rod 231 of the second transmitting assembly 23.

With reference to FIGS. 1 to 5, the first screw assembly 312 has a first screw 313 and a first barrel 314. The first barrel 314 is disposed around the first screw 313, is fixedly disposed in the first linear moving member 311, and is located between the first screw 313 and the first linear moving member 311. The second screw assembly 322 has a second screw 323 and a second barrel 324. The second barrel 324 is disposed around the second screw 323, is fixedly disposed in the second linear moving member 321, and is located between the second screw 323 and the second linear moving member 321. A distal end of the first screw 313 is connected to a first bearing seat 316 disposed on the base 10. A distal end of the second screw 323 is connected to a second bearing seat 326 disposed on the base 10.

With reference to FIGS. 1 to 5, the first linear driving assembly 311 has a first sliding block 315. The first sliding block 315 is slidably disposed on the first slide rail 11. The second linear driving assembly 321 has a second sliding block 325. The second sliding block 325 is slidably disposed on the second slide rail 12.

With reference to FIGS. 1 to 5, the driving motor assembly 40 is disposed on the base 10. In addition, the driving motor assembly 40 is disposed on the base 10 by a supporting seat. The driving motor assembly 40 has a first motor 41 having a first output rod and a second motor 42 having a second output rod. The first motor 41 and the second motor 42 are stepper motors and have high torque density ratios, respectively. The first output rod of the first motor 41, the second output rod of the second motor 42, the first linear driving assembly 31, and the second linear driving assembly 32 are juxtaposed in parallel on the base 10.

With reference to FIGS. 1 to 5, the transmission 50 is disposed between the linear driving mechanism 30 and the driving motor assembly 40. The transmission 50 has a first wheel transmitting assembly 51 and a second wheel transmitting assembly 52. The first wheel transmitting assembly 51 is connected to the first output rod of the first motor 41 and the first linear driving assembly 31. The second wheel transmitting assembly 52 is connected to the second output rod of the second motor 42 and the second linear driving assembly 32. Moreover, the first screw 313 of the first screw assembly 312 is connected to the first wheel transmitting assembly 51. The second screw 323 of the second screw assembly 322 is connected to the second wheel transmitting assembly 52. The first wheel transmitting assembly 51 and the second wheel transmitting assembly 52 are pulley assemblies, sprocket assemblies, or gear assemblies for providing a reduction function. In the embodiment of the joint module, the first wheel transmitting assembly 51 and the second wheel transmitting assembly 52 are pulley assemblies. The first wheel transmitting assembly 51 and the second wheel transmitting assembly 52 are disposed at the second end 102 of the base 10 for ease of assembly and replacement.

Figure 6:
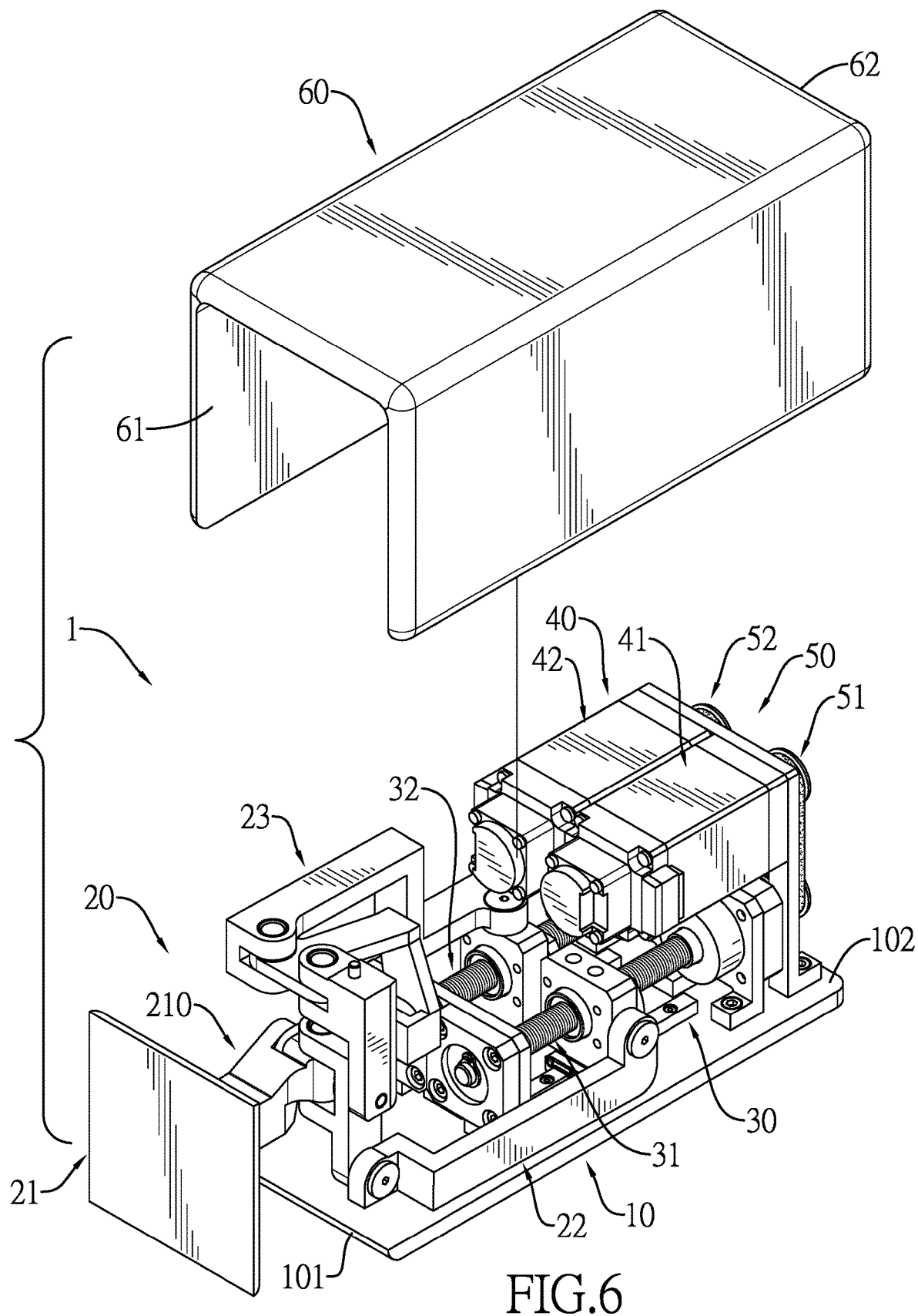
FIG. 6 is an exploded perspective view of the joint module in FIG. 1, combined with a shell.
Figure 7:
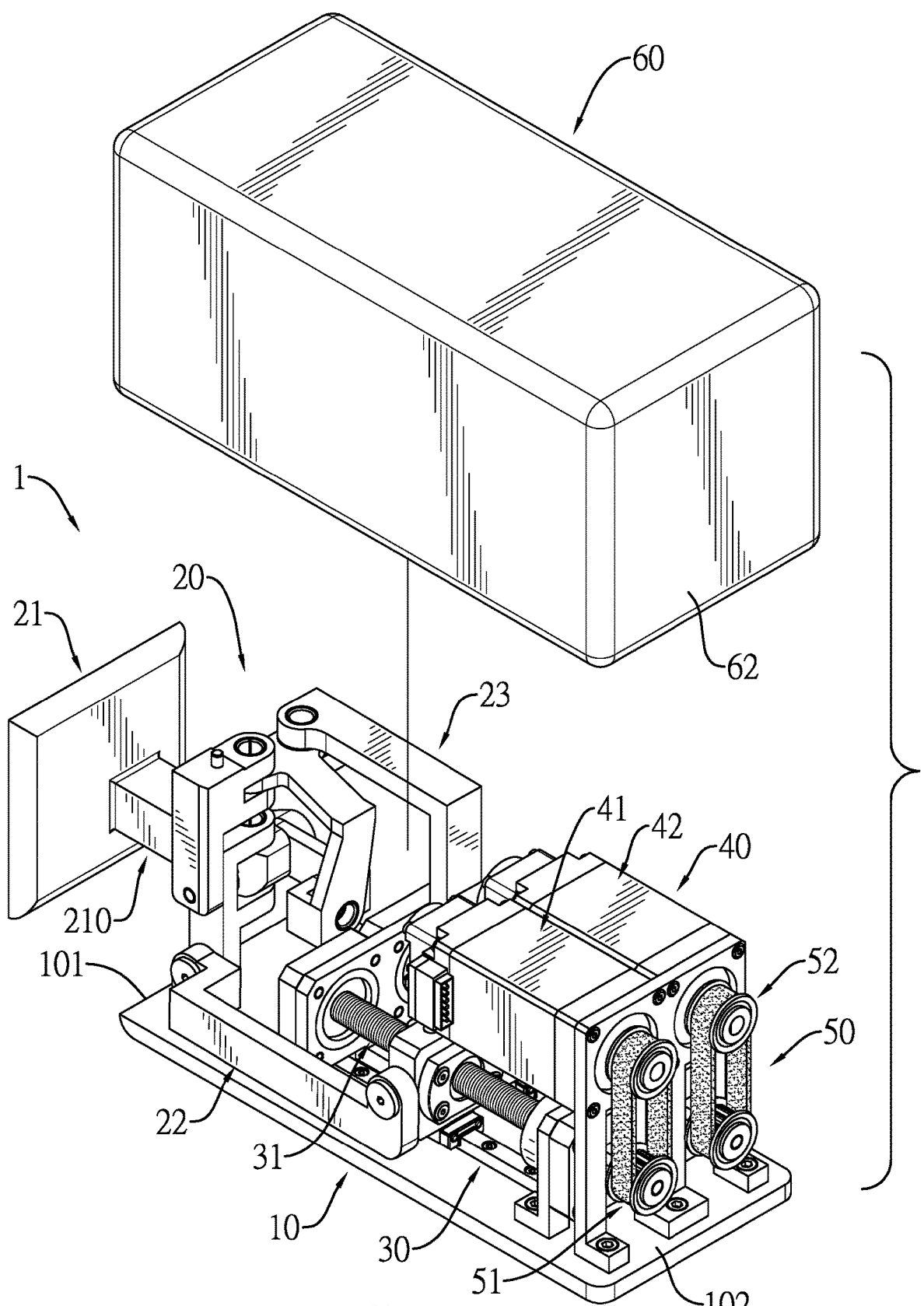
FIG. 7 is another exploded perspective view of the joint module in FIG. 6.
Figure 8:
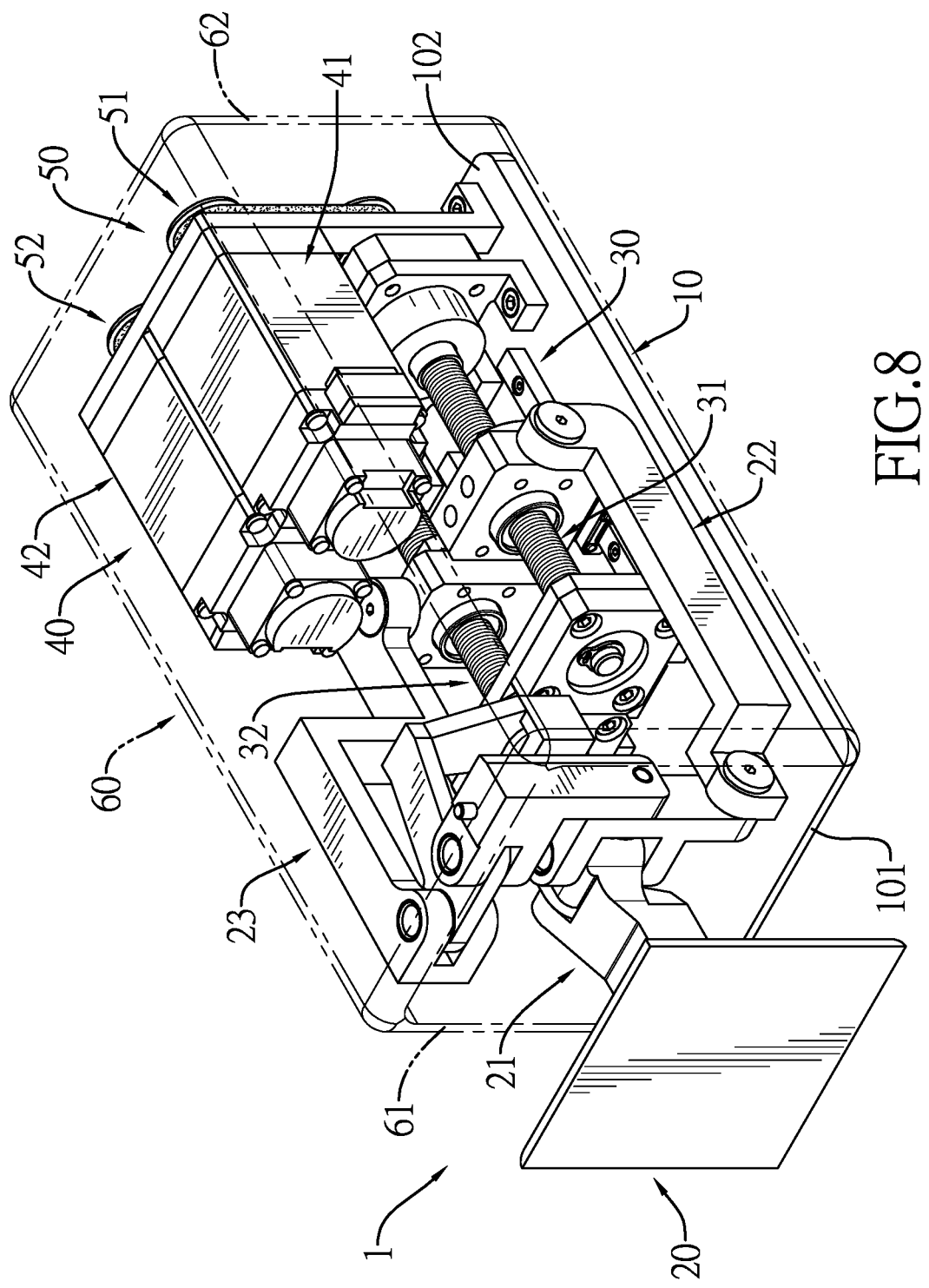
FIG. 8 is a perspective view of the joint module in FIG. 1, combined with the shell.

The reduction ratio of the transmission 50 may be from 1:0.45 to 1:2.25. The driving energy provided by the driving motor assembly 40 can be applied efficiently. The reduction ratio of the driving motor assembly 40 and the transmission 50 is adjustable. The reduction ratio is variable when the size and the structure of the joint module 1 are not changed. The joint module 1 can be reused and is easy to customize With reference to FIGS. 6 to 8, the joint module 1 has a shell 60, a chamber, and an opening 61. The shell 60 is disposed on the base 10. The chamber is formed between the shell 60 and the base 10. The opening 61 is formed on the shell 60 adjacent to the first end of the base 10 and is in communication with the chamber of the joint module 1. The motion element 21 passes through the opening 61. The motion mechanism 20, the first linear driving assembly 31, the second linear driving assembly 32, the first motor 41, the second motor 42, the first wheel transmitting assembly 51, and the second wheel transmitting assembly 52 are disposed in the chamber of the joint module 1. The joint module 1 further has an outer plate 62. The outer plate 62 is formed on the shell 60 adjacent to the second end 102 of the base 10. The outer plate 62 can be connected to a motion element 21 of another joint module 1.

Furthermore, the joint module 1 may have two strain gauges. The two strain gauges are respectively disposed on the first transmitting assembly 22 and the second transmitting assembly 23 for respectively measuring deformations of the first transmitting assembly 22 and the second transmitting assembly 23. The joint module 1 may be combined with a force controlled system for moving accurately.

Figure 9:
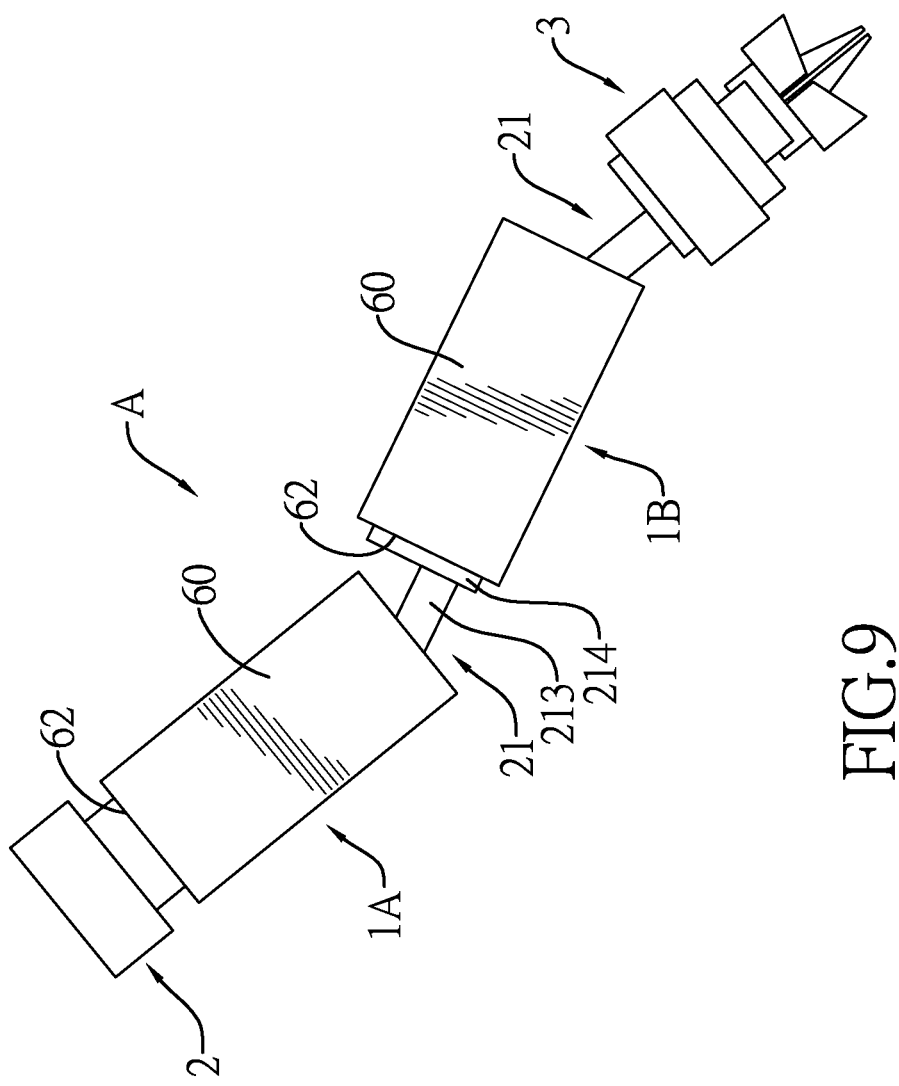
FIG. 9 is a side view of a multi joint modular robot arm in accordance with the present invention, showing two joint modules connected in series.
Figure 10:
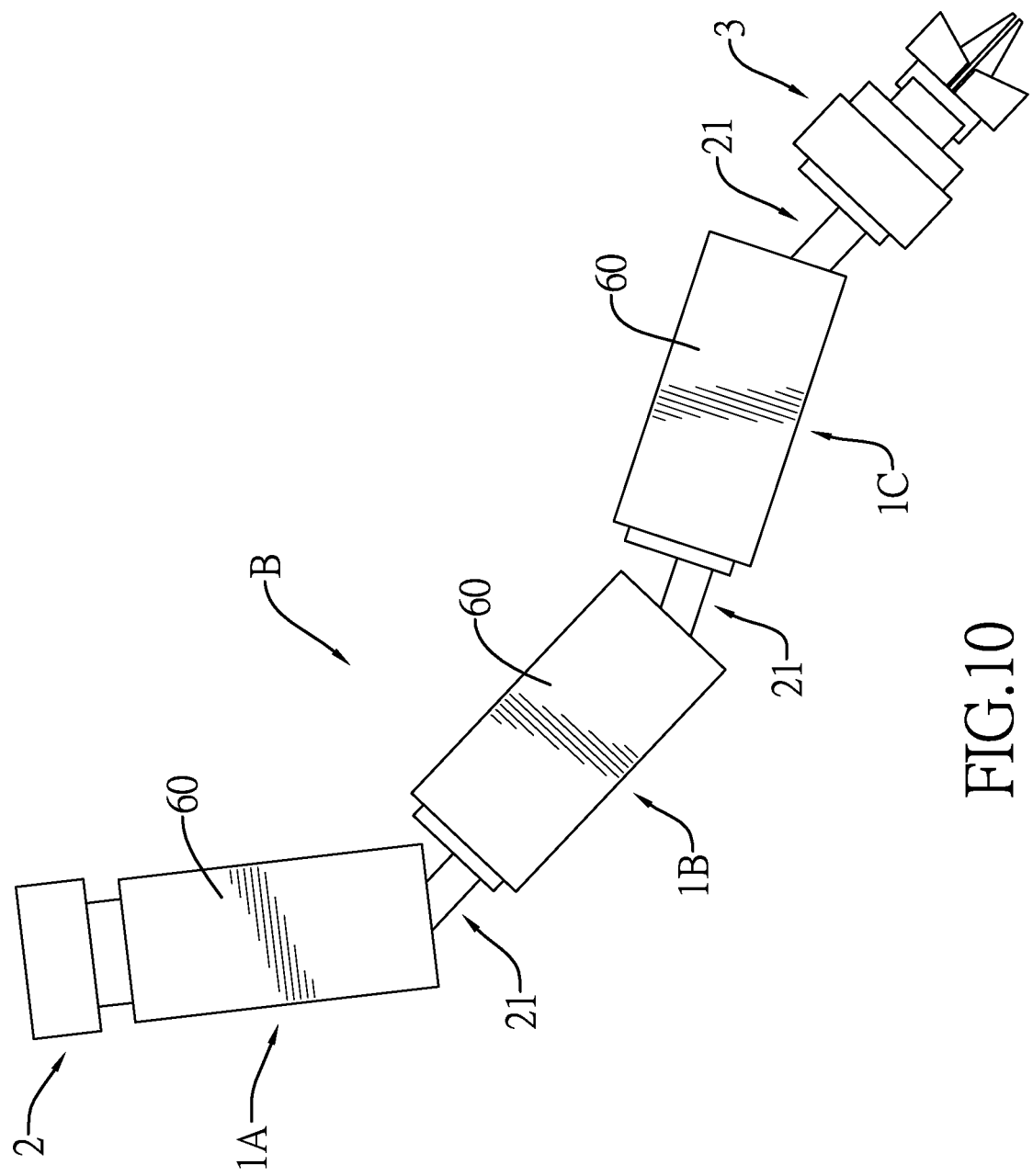
FIG. 10 is a side view of another multi joint modular robot arm in accordance with the present invention, showing three joint modules connected in series.

With reference to FIGS. 9 and 10, a multi joint modular robot arm A, B in accordance with the present invention comprises multiple joint modules 1A, 1B, 1C as described in FIGS. 1 to 8. The joint modules 1A, 1B, 1C are connected with each other in series. Each two joint modules 1A, 1B, 1C are connected in series. The base 10 of one of said two joint modules 1A, 1B, 1C is connected to the motion element 21 of another one of said two joint modules 1A, 1B, 1C. The end plate 214 of the motion element 21 of one of the joint modules 1A, 1B, 1C is fixedly connected to the outer plate 62 of another one of the joint modules 1A, 1B, 1C for connecting in series.

Take the joint modules having the shell 60 connected in series as an example. With reference to FIG. 9, the multi joint modular robot arm A has a first joint module 1A and a second joint module 1B connected to the first joint module 1A in series. The independent first joint module 1A and the independent second joint module 1B both have two degrees of freedom. Two ends of the first joint module 1A are respectively connected to the second joint module 1B and a rotating driver 2. A clamping apparatus 3 is connected to the second joint module 1B and is opposite to the first joint module 1A. The first joint module 1A combined with the rotating driver 2 has three degrees of freedom. The second joint module 1B combined with the clamping apparatus 3 has three degrees of freedom. Thus, the multi joint modular robot arm A has six degrees of freedom. The multi joint modular robot arm A is equal to a six-axis robot in motion function.

Figure 11:
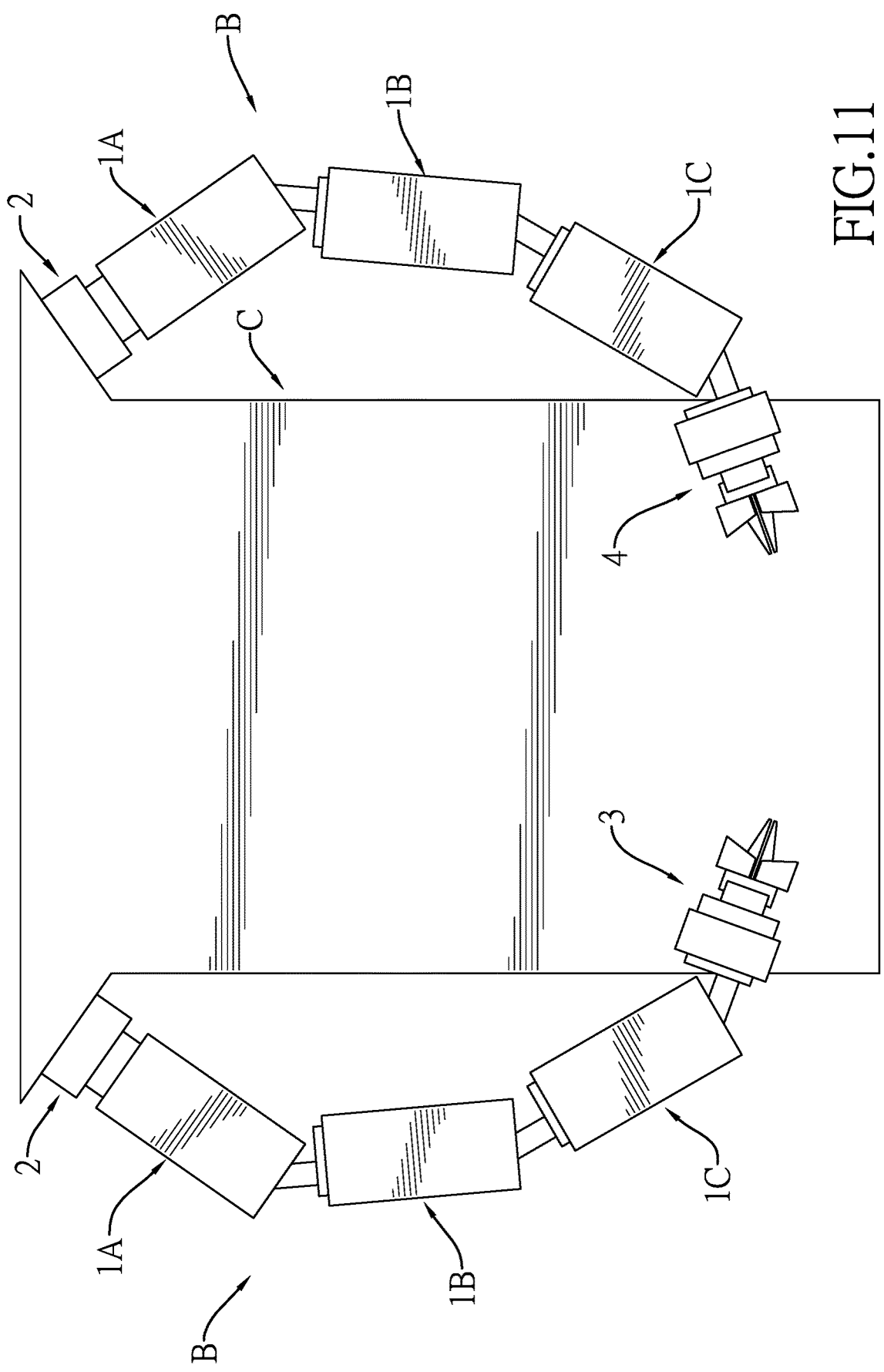
FIG. 11 is an operational side view of the multi joint modular robot arm in FIG. 10.

With reference to FIG. 10, the multi joint modular robot arm B has a first joint module 1A, a second joint module 1B, and a third joint module 1C. The second joint module 1B is connected to the first joint module 1A and the third joint module 1C in series. The first joint module 1A, the second joint module 1B, and the third joint module 1C all have two degrees of freedom. A rotating driver 2 is connected to the first joint module 1A and is opposite to the second joint module 1B. A clamping apparatus 3 is connected to the third joint module 1C and is opposite to the second joint module 1B. The first joint module 1A combined with the rotating driver 2 has three degrees of freedom. The third joint module 1C combined with the clamping apparatus 3 has three degrees of freedom. Thus, the multi joint modular robot arm B has eight degrees of freedom. A human arm has seven degrees of freedom. Therefore, the multi joint modular robot arm B has more degrees of freedom than the human arm. Therefore, the multi joint modular robot arm B is flexible. With reference to FIG. 11, two multi joint modular robot arms B are respectively disposed on two sides of a robot body C and generate the motions as the motion of the human arms.

The multi joint modular robot aim may have two joint modules or three joint modules, but it is not limited thereto.

Figure 12:
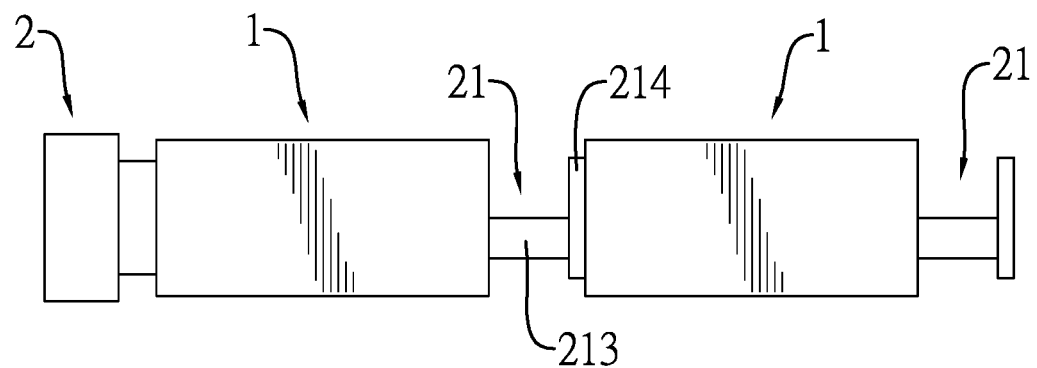
FIG. 12 is an initial operational side view of the multi joint modular robot arm showing an angle between the central axes of the two joint modules being 0 degree.
Figure 13:
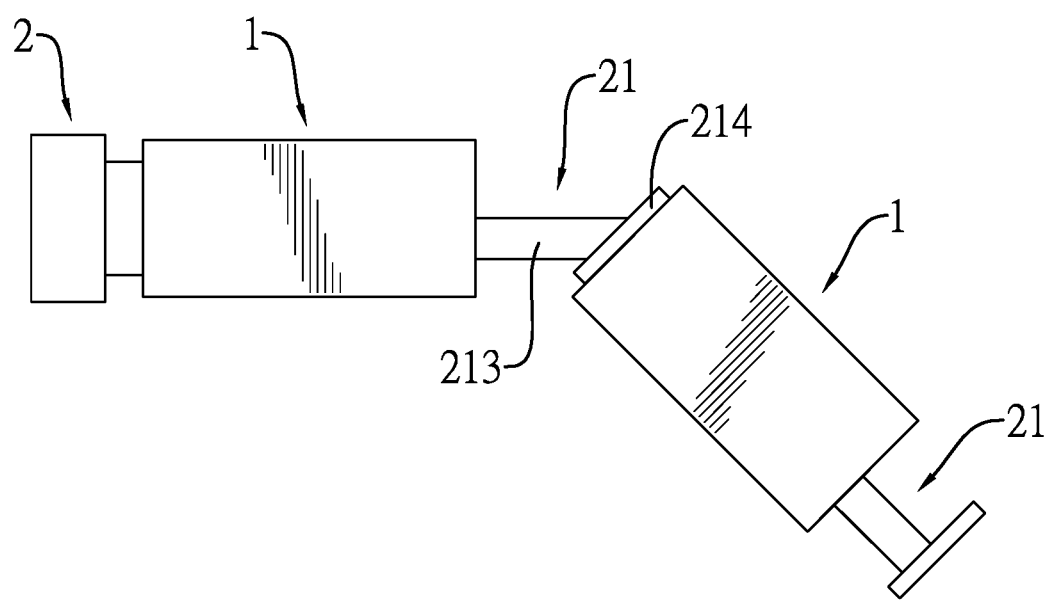
FIG. 13 is an initial operational side view of the multi joint modular robot arm showing an angle between the central axes of the two joint modules being 45 degrees.
Figure 14:
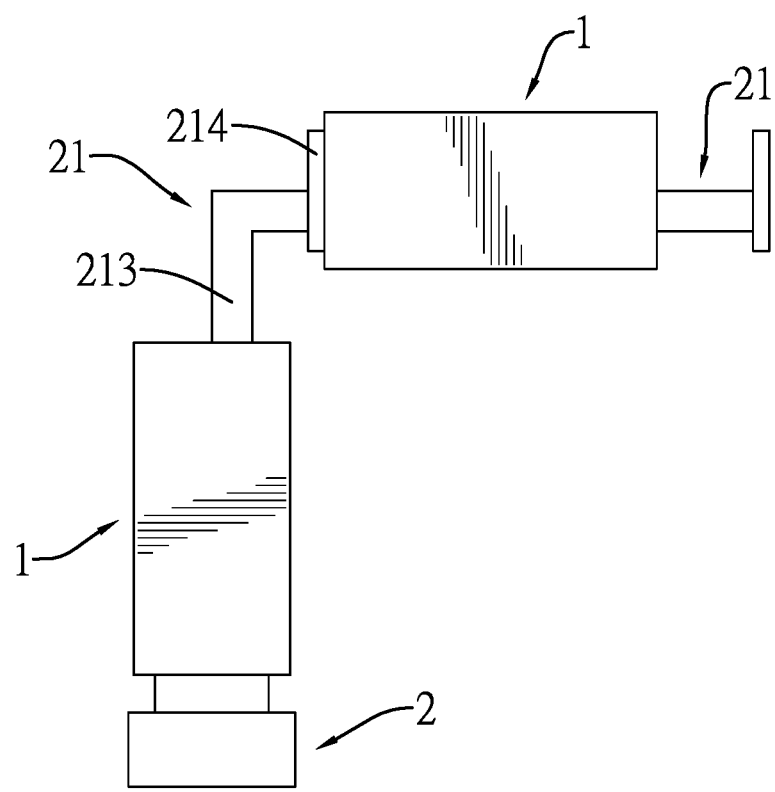
FIG. 14 is an initial operational side view of the multi joint modular robot arm showing an angle between the central axes of the two joint modules being 90 degrees.
Figure 15:
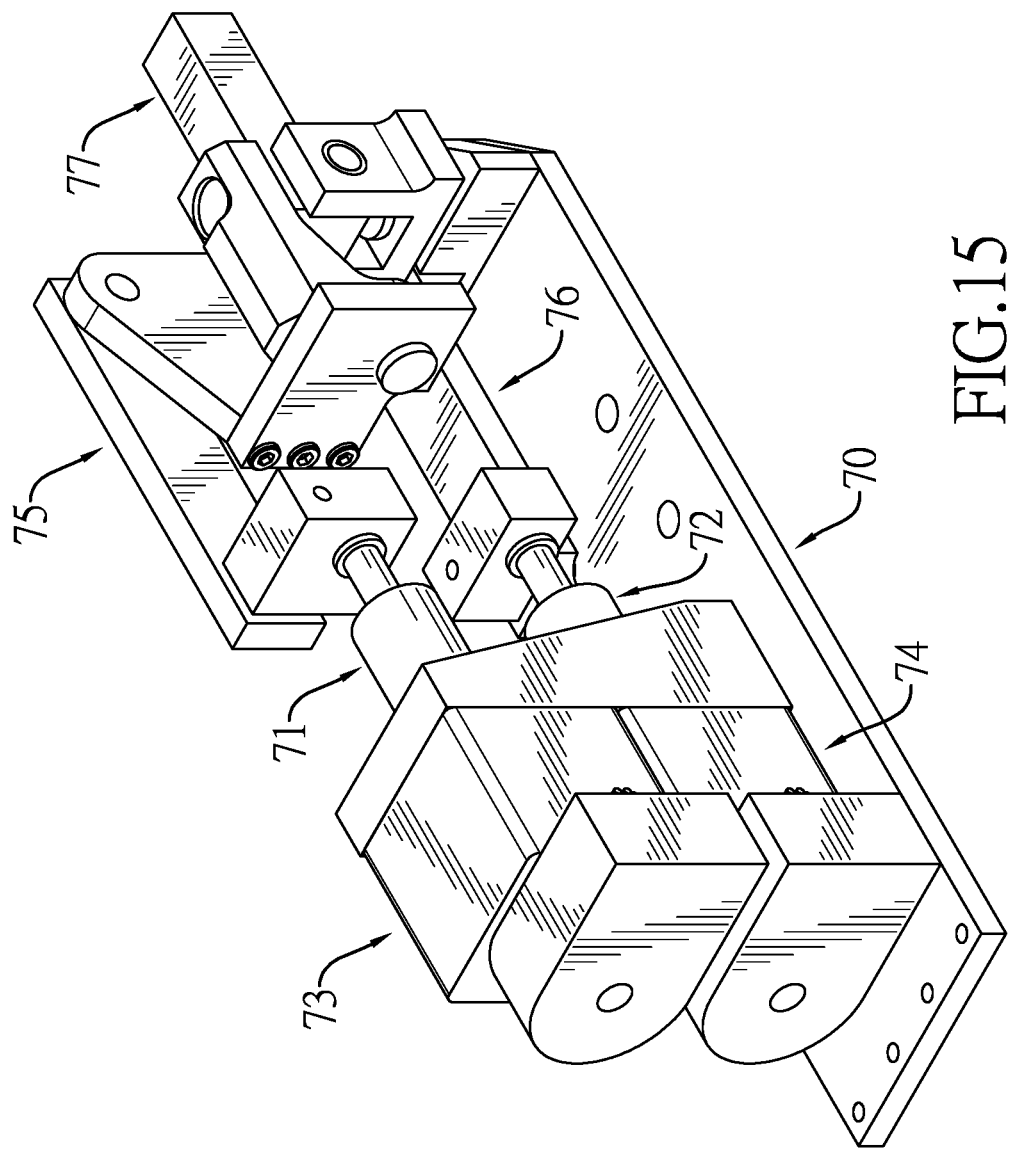
FIG. 15 is a perspective view of a joint module in accordance with the prior art.
Figure 16:
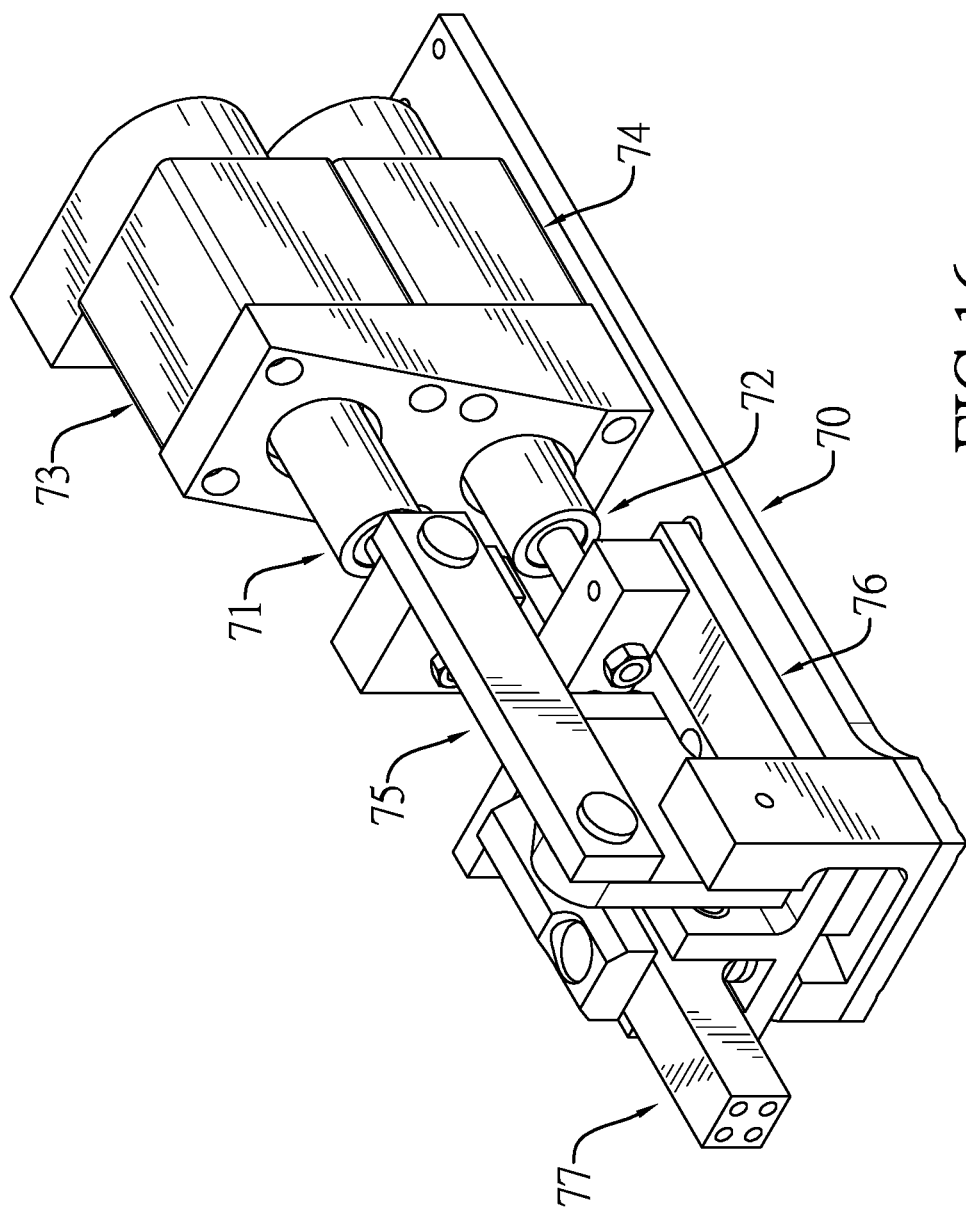
FIG. 16 is another perspective view of the joint module in FIG. 15.
Figure 17:
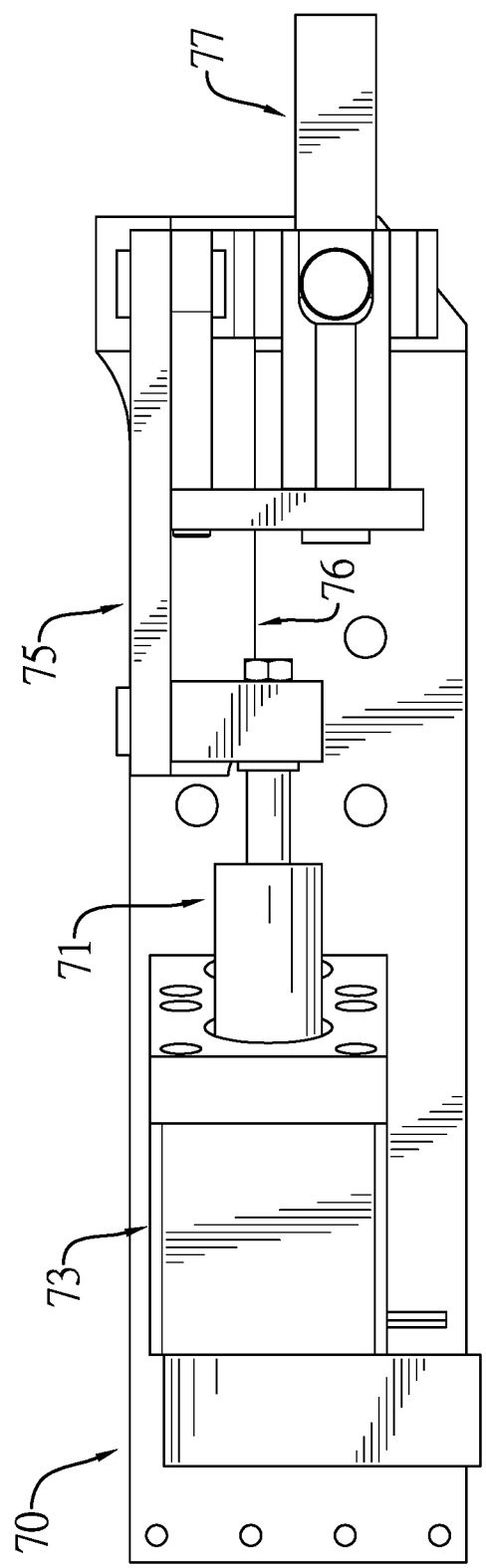
FIG. 17 is a top view of the joint module in FIG. 15.
Figure 18:
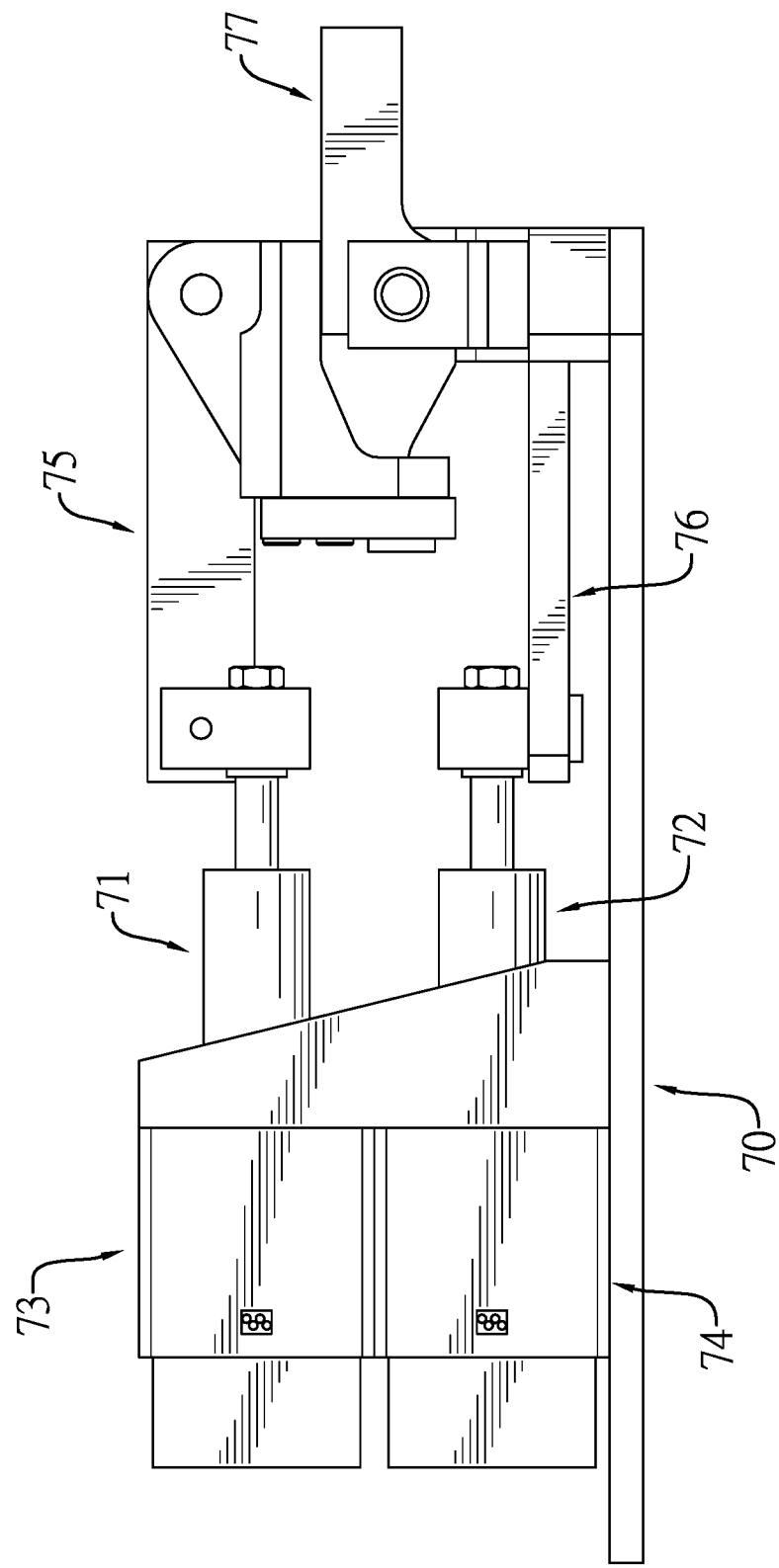
FIG. 18 is a side view of the joint module in FIG. 15.

With reference to FIGS. 12, 13, and 14, the multi joint modular robot arm has two joint modules 1. The two joint modules 1 are connected in series. A relative initial position between the two joint modules 1 can be changed by a relative angular change between the connecting rod portion 213 and the end plate 214 in a connecting position of the two joint modules 1. With reference to FIG. 12, in the connecting position of the two joint modules 1, the connecting rod portion 213 is straight. The end plate 214 is vertically connected to a distal end of the connecting rod portion 213. In the relative initial position between the two joint modules 1, an angle between the central axes 100 of the two joint modules 1 is 0 degree.

With reference to FIG. 13, in the connecting position of the two joint modules 1, the connecting rod portion 213 is straight. The end plate 214 is connected to a distal end of the connecting rod portion 213 at an angle of 45 degrees. In the relative initial position between the two joint modules 1, an angle between the central axes 100 of the two joint modules 1 is 45 degrees. With reference to FIG. 14, in the connecting position of the two joint modules 1, the connecting rod portion 213 is L-shaped. In the relative initial position between the two joint modules 1, an angle between the central axes 100 of the two joint modules 1 is 90 degrees. The angle between the central axes 100 can be changed by the change of the connecting rod portion 213.

Accordingly, the multi joint modular robot arm has the joint modules 1A, 1B, 1C connected in series. Each joint module has the function of biaxial rotating movement. The combination of the joint modules in the multi joint modular robot arm is variable. The reduction ratio of each joint module may be changed by the transmission 50. The driving energy provided by the driving motor assembly 40 can be applied efficiently. The reduction ratio of the driving motor assembly 40 and the transmission 50 is adjustable and is variable when the size and the structure of the joint module are not changed. The multi joint modular robot arm can be reused and is easy to customize. The practicality of the multi joint modular robot arm is good.

What is claimed is:

1. A joint module comprising:
   a base having
      a central axis defined on the base;
      an X axial direction;
      a Y axial direction perpendicular to the X axial direction;
      a Z axial direction perpendicular to the X axial direction and the Y axial direction; and
      a direction of the central axis being the Z axial direction;
   a motion mechanism disposed on the base and having a motion element, a first transmitting assembly, and a second transmitting assembly, and the first transmitting assembly and the second transmitting assembly disposed on the base in parallel and connected to the motion element, and
   the motion element having
      a motion part having a connecting rod portion, and the connecting rod portion having a connecting end;
      an X axial rod disposed through the connecting end of the connecting rod portion;
      a Y axial rod disposed through the connecting end of the connecting rod portion;
   the first transmitting assembly having
      a first transmitting member having an end pivotally connected to a first linear moving member; and
      a second transmitting member having
         two ends pivotally connected to another end of the first transmitting member and the X axial rod respectively, wherein the X axial rod is a fulcrum, and the motion part is rotated along the Y axial direction by the first transmitting assembly;
   the second transmitting assembly having a first rod, a second rod, and a third rod, an end of the first rod pivotally connected to a second linear moving member, two ends of the second rod pivotally connected to another end of the first rod and an end of the third rod respectively, and another end of the third rod pivotally connected to the Y axial rod, wherein the Y axial rod is a fulcrum, and the motion part is rotated along the X axial direction by the second transmitting assembly; and
   the motion mechanism having a motion seat, the motion seat rotated along the X axial direction and disposed on the base, an end of the motion seat at the Y axial direction connected to an X axial pivoting component for pivoting the second transmitting member, another end of the motion seat at the Y axial direction connected to a Y axial pivoting component for pivoting the second rod, and a pivoted portion between the motion seat and the second rod located beside a pivoted portion between the first rod and the second rod;
   wherein the motion element is driven for having a spherical movement centered on the central axis of the base;
   a linear driving mechanism disposed on the base and having a first linear driving assembly and a second linear driving assembly, and the first linear driving assembly and the second linear driving assembly being non-coaxial and disposed on the base in parallel;
   the first linear driving assembly having
      the first linear moving member connected to the first transmitting assembly; and
      a first screw assembly connected to the first linear moving member, wherein the first linear moving member is driven by the first screw assembly to reciprocate along the central axis; and
   the second linear driving assembly having
      the second linear moving member connected to the second transmitting assembly; and
      a second screw assembly connected to the second linear moving member, wherein the second linear moving member is driven by the second screw assembly to reciprocate along the central axis;
   a driving motor assembly disposed on the base and having a first motor having a first output rod and a second motor having a second output rod; and
   a transmission disposed between the linear driving mechanism and the driving motor assembly, and having
      a first wheel transmitting assembly connected to the first output rod of the driving motor assembly and the first linear driving assembly; and
      a second wheel transmitting assembly connected to the second output rod of the driving motor assembly and the second linear driving assembly.

2. The joint module as claimed in claim 1, wherein the base has a first end and a second end defined along the central axis of the base, and the motion element is disposed on the first end of the base, and the first output rod of the driving motor assembly, the second output rod of the driving motor assembly, the first linear moving member, and the second linear moving member are juxtaposed in parallel on the base, and the first wheel transmitting assembly and the second wheel transmitting assembly are disposed at the second end of the base.

3. The joint module as claimed in claim 2, wherein
   the first motor and the second motor are stepper motors;
   the first wheel transmitting assembly and the second wheel transmitting assembly are pulley assemblies, sprocket assemblies, or gear assemblies;
   the first screw assembly has
      a first screw connected to the first wheel transmitting assembly; and
      a first barrel disposed between the first screw and the first linear moving member; and
   the second screw assembly has
      a second screw connected to the second wheel transmitting assembly; and
      a second barrel disposed between the second screw and the second linear moving member.

4. The joint module as claimed in claim 3, wherein the joint module has
   a shell disposed on the base;

a chamber formed between the shell and the base;
an opening formed on the shell adjacent to the first end of the base and communicating with the chamber; and
an outer plate formed on the shell adjacent to the second end of the base; and
the motion mechanism, the linear driving mechanism, the driving motor assembly, and the transmission are disposed in the chamber of the joint module.

5. The joint module as claimed in claim 4, wherein the joint module has
a first slide rail disposed on the base and being parallel with the first screw; and
second slide rail disposed on the base and being parallel with the first screw;
the first linear driving assembly has
a first sliding block slidably disposed on the first slide rail; and
the second linear driving assembly has
a second sliding block slidably disposed on the second slide rail.

6. The joint module as claimed in claim 1, wherein the joint module has two strain gauges, and the two strain gauges are respectively disposed on the first transmitting assembly and the second transmitting assembly for measuring deformations of the first transmitting assembly and the second transmitting assembly.

7. The joint module as claimed in claim 2, wherein the joint module has two strain gauges, and the two strain gauges are respectively disposed on the first transmitting assembly and the second transmitting assembly for measuring deformations of the first transmitting assembly and the second transmitting assembly.

8. The joint module as claimed in claim 3, wherein the joint module has two strain gauges, and the two strain gauges are respectively disposed on the first transmitting assembly and the second transmitting assembly for measuring deformations of the first transmitting assembly and the second transmitting assembly.

9. The joint module as claimed in claim 4, wherein the joint module has two strain gauges, and the two strain gauges are respectively disposed on the first transmitting assembly and the second transmitting assembly for measuring deformations of the first transmitting assembly and the second transmitting assembly.

10. The joint module as claimed in claim 5, wherein the joint module has two strain gauges, and the two strain gauges are respectively disposed on the first transmitting assembly and the second transmitting assembly for measuring deformations of the first transmitting assembly and the second transmitting assembly.

11. A multi joint modular robot arm comprising:
multiple joint modules connected in series, and each joint module having
a base having
a central axis defined in the base;
an X axial direction;
a Y axial direction perpendicular to the X axial direction;
a Z axial direction perpendicular to the X axial direction and the Y axial direction; and
a direction of the central axis being the Z axial direction;
a motion mechanism disposed on the base and having a motion element, a first transmitting assembly, and a second transmitting assembly, and the first transmitting assembly and the second transmitting assembly disposed on the base in parallel and connected to the motion element, and
the motion element having
a motion part having a connecting rod portion, and the connecting rod portion having a connecting end;
an X axial rod disposed through the connecting end of the connecting rod portion;
a Y axial rod disposed through the connecting end of the connecting rod portion;
the first transmitting assembly having
a first transmitting member having an end pivotally connected to a first linear moving member; and
a second transmitting member having
two ends pivotally connected to another end of the first transmitting member and the X axial rod respectively, wherein the X axial rod is a fulcrum, and the motion part is rotated along the Y axial direction by the first transmitting assembly;
the second transmitting assembly having a first rod, a second rod, and a third rod, an end of the first rod pivotally connected to a second linear moving member, two ends of the second rod pivotally connected to another end of the first rod and an end of the third rod respectively, and another end of the third rod pivotally connected to the Y axial rod, wherein the Y axial rod is a fulcrum, and the motion part is rotated along the X axial direction by the second transmitting assembly; and
the motion mechanism having a motion seat, the motion seat rotated along the X axial direction and disposed on the base, an end of the motion seat at the Y axial direction connected to an X axial pivoting component for pivoting the second transmitting member, another end of the motion seat at the Y axial direction connected to a Y axial pivoting component for pivoting the second rod, and a pivoted portion between the motion seat and the second rod located beside a pivoted portion between the first rod and the second rod;
wherein the motion element is driven for having a spherical movement centered on the central axis of the base;
a linear driving mechanism disposed on the base and having a first linear driving assembly and a second linear driving assembly, and the first linear driving assembly and the second linear driving assembly being non-coaxial and disposed on the base in parallel, and
the first linear driving assembly having
the first linear moving member connected to the first transmitting assembly; and
a first screw assembly connected to the first linear moving member, wherein the first linear moving member is driven by the first screw assembly to reciprocate along the central axis; and
the second linear driving assembly having
the second linear moving member connected to the second transmitting assembly; and
a second screw assembly connected to the second linear moving member, wherein the second linear moving member is driven by the second screw assembly to reciprocate along the central axis;

a driving motor assembly disposed on the base and having a first motor having a first output rod and a second motor having a second output rod; and a transmission disposed between the linear driving mechanism and the driving motor assembly, the transmission having a first wheel transmitting assembly connected to the first output rod of the driving motor assembly and the first linear driving assembly; and a second wheel transmitting assembly connected to the second output rod of the driving motor assembly and the second linear driving assembly; and each two joint modules connected in series, and the base of one of said two joint modules connected to the motion element of another one of said two joint modules.

12. The multi joint modular robot arm as claimed in claim 11, wherein the multi joint modular robot arm has three joint modules connected in series, the three joint modules contain a first joint module, a second joint module, and a third joint module, the first joint module has a rotating driver, the rotating driver is disposed at the second end of the base of the first joint module, the second joint module is disposed between the first joint module and the third joint module, the third joint module has a clamping apparatus, and the clamping apparatus is disposed on the motion mechanism of the third joint module.

13. The multi-joint modular robot arm as claimed in claim 11, wherein in each joint module, the base has a first end and a second end defined along the central axis of the base, the motion element is disposed on the first end of the base, the first output rod of the driving motor assembly, the second output rod of the driving motor assembly, the first linear moving member, and the second linear moving member are juxtaposed in parallel on the base, and the first wheel transmitting assembly and the second wheel transmitting assembly are disposed at the second end of the base.

14. The multi-joint modular robot arm as claimed in claim 13, wherein in each joint module the first motor and the second motor are stepper motors;

the first wheel transmitting assembly and the second wheel transmitting assembly are pulley assemblies, sprocket assemblies, or gear assemblies;

the first screw assembly has a first screw connected to the first wheel transmitting assembly; and a first barrel disposed between the first screw and the first linear moving member; and the second screw assembly has a second screw connected to the second wheel transmitting assembly; and a second barrel disposed between the second screw and the second linear moving member.

* * * * *